(12) United States Patent
Kapogianis et al.

(10) Patent No.: US 10,578,403 B2
(45) Date of Patent: Mar. 3, 2020

(54) FIREARM ELECTRONIC SYSTEM

(71) Applicant: VK Integrated Systems, Inc., Fullerton, CA (US)

(72) Inventors: Vasilios K. Kapogianis, Fullerton, CA (US); Steve I. Aguilar, Fullerton, CA (US); Daniel Pico, Fullerton, CA (US)

(73) Assignee: VK Integrated Systems, Inc., Fullerton, CA (US)

( * ) Notice: Subject to any disclaimer, the term of this patent is extended or adjusted under 35 U.S.C. 154(b) by 284 days.

(21) Appl. No.: 15/424,571

(22) Filed: Feb. 3, 2017

(65) Prior Publication Data

US 2019/0003803 A1  Jan. 3, 2019

Related U.S. Application Data

(60) Provisional application No. 62/290,785, filed on Feb. 3, 2016.

(51) Int. Cl.
*G09B 9/00* (2006.01)
*F41G 3/26* (2006.01)
(Continued)

(52) U.S. Cl.
CPC .................. *F41G 3/26* (2013.01); *F41A 3/78* (2013.01); *F41A 17/063* (2013.01); *F41A 19/61* (2013.01);
(Continued)

(58) Field of Classification Search
CPC ..... F41G 3/16; F41G 3/26; F41G 7/36; F41G 7/346; F41G 3/02; F41G 3/165;
(Continued)

(56) References Cited

U.S. PATENT DOCUMENTS 6,899,539 B1  5/2005 Stallman et al.
8,686,576 B1  4/2014 Smith
(Continued)

FOREIGN PATENT DOCUMENTS

WO   WO2014145079   9/2014
WO   WO2015154161   10/2015

OTHER PUBLICATIONS

Examination Report from Australian Patent Application No. 2017252150 dated Jan. 18, 2019.
(Continued)

*Primary Examiner* — Jonathan C Weber
(74) *Attorney, Agent, or Firm* — Paul J. Backofen, Esq.

(57) ABSTRACT

Man portable weapons include integrated electronics that calculate orientation and movement in addition to providing that data to a user's heads-up displays (HUD) as well as to group and area networks. By passing data to a HUD, the user is able to see, virtually, the flight path, point of impact and other ballistic data as well as data representing the condition and performance of the weapon for any rounds fired. The HUD also displays the relative position of other members of the team, last known enemy area of operation and other useful parameters from the man portable weapons of the other team members through the network. The electronics may be integrated within the main components of any suitable man portable weapon in a non-intrusive way as to have no effect on the firing mechanism of the small arm when it is fully assembled.

15 Claims, 8 Drawing Sheets

(51) Int. Cl.

| | | |
|---|---|---|
| *F41A 17/06* | (2006.01) | |
| *F41G 3/08* | (2006.01) | |
| *F41G 3/12* | (2006.01) | |
| *F41A 3/78* | (2006.01) | |
| *F41C 27/00* | (2006.01) | |
| *F41G 3/04* | (2006.01) | |
| *F41A 19/61* | (2006.01) | |
| *F41G 7/34* | (2006.01) | |
| *F41G 7/36* | (2006.01) | |
| *F41G 3/22* | (2006.01) | |
| *F41G 3/16* | (2006.01) | |

(52) U.S. Cl.
CPC ............... *F41C 27/00* (2013.01); *F41G 3/04* (2013.01); *F41G 3/08* (2013.01); *F41G 3/12* (2013.01); *F41G 7/346* (2013.01); *F41G 7/36* (2013.01); *G09B 9/003* (2013.01); *F41G 3/165* (2013.01); *F41G 3/225* (2013.01)

(58) Field of Classification Search
CPC ... F41G 3/04; F41G 9/00; F41A 33/00; F41A 99/00; F41A 3/78; F41A 17/063; F41A 19/61; F03G 7/08; F41C 27/00; F02B 63/04; G09B 9/0033; G09B 9/006; G09B 9/003
USPC ............. 89/1.11; 235/400, 404; 434/19, 11; 42/84
See application file for complete search history.

(56) References Cited

U.S. PATENT DOCUMENTS

| | | | | |
|---|---|---|---|---|
| 8,739,672 | B1* | 6/2014 | Kelly ................. | F41G 3/02 89/1.11 |
| 8,762,091 | B1 | 6/2014 | Foxlin et al. | |
| 9,752,840 | B1* | 9/2017 | Betro ................. | H04W 4/029 |
| 2003/0216884 | A1* | 11/2003 | Cardarelli .......... | G01C 19/5719 702/145 |
| 2006/0005447 | A1* | 1/2006 | Lenner ............... | F41G 3/06 42/111 |
| 2006/0123643 | A1* | 6/2006 | Campbell ........... | F42B 15/01 33/366.13 |
| 2006/0243125 | A1* | 11/2006 | La France .......... | F41A 21/26 89/31 |
| 2006/0253253 | A1 | 11/2006 | Reynolds et al. | |
| 2008/0204361 | A1* | 8/2008 | Scales ............... | F41G 3/165 345/8 |
| 2010/0196859 | A1 | 8/2010 | Saugen et al. | |
| 2011/0048103 | A1* | 3/2011 | Su .................... | G01C 21/16 73/1.79 |
| 2011/0173865 | A1* | 7/2011 | Compton ........... | F41G 11/003 42/84 |
| 2012/0062388 | A1* | 3/2012 | Wilson .............. | G06Q 10/0833 340/686.6 |
| 2012/0067201 | A1* | 3/2012 | Barger .............. | F41G 1/01 89/41.19 |
| 2012/0297654 | A1 | 11/2012 | Williams et al. | |
| 2013/0192451 | A1* | 8/2013 | Scott ................ | F41G 3/00 89/41.05 |
| 2013/0337415 | A1 | 12/2013 | Huet | |
| 2014/0230296 | A1* | 8/2014 | Kuparinen ......... | F41A 17/063 42/1.01 |
| 2015/0064679 | A1* | 3/2015 | Ballestra ........... | G09B 5/08 434/324 |
| 2015/0064682 | A1* | 3/2015 | Mattiuzzo .......... | G09B 5/08 434/351 |
| 2015/0300786 | A1* | 10/2015 | Downing ........... | H04W 84/12 235/404 |
| 2016/0069629 | A1* | 3/2016 | Seckman ........... | F41A 19/01 42/1.02 |
| 2016/0165192 | A1* | 6/2016 | Saatchi ............. | H04N 5/772 386/227 |
| 2016/0173832 | A1* | 6/2016 | Stewart ............. | F41A 17/20 348/158 |
| 2016/0223278 | A1* | 8/2016 | Schechter ......... | F41A 17/063 |
| 2017/0146319 | A1* | 5/2017 | Lyren .............. | F41G 1/54 |
| 2018/0196628 | A1* | 7/2018 | Samo .............. | F41G 3/08 |
| 2018/0374380 | A1* | 12/2018 | Ford ............... | G09B 9/003 |
| 2019/0003804 | A1* | 1/2019 | Deng ............... | F41A 35/00 |

OTHER PUBLICATIONS

International Search Report and Written Opinion dated Oct. 20, 2017 from International Application No. PCT/US2017/016565.

* cited by examiner

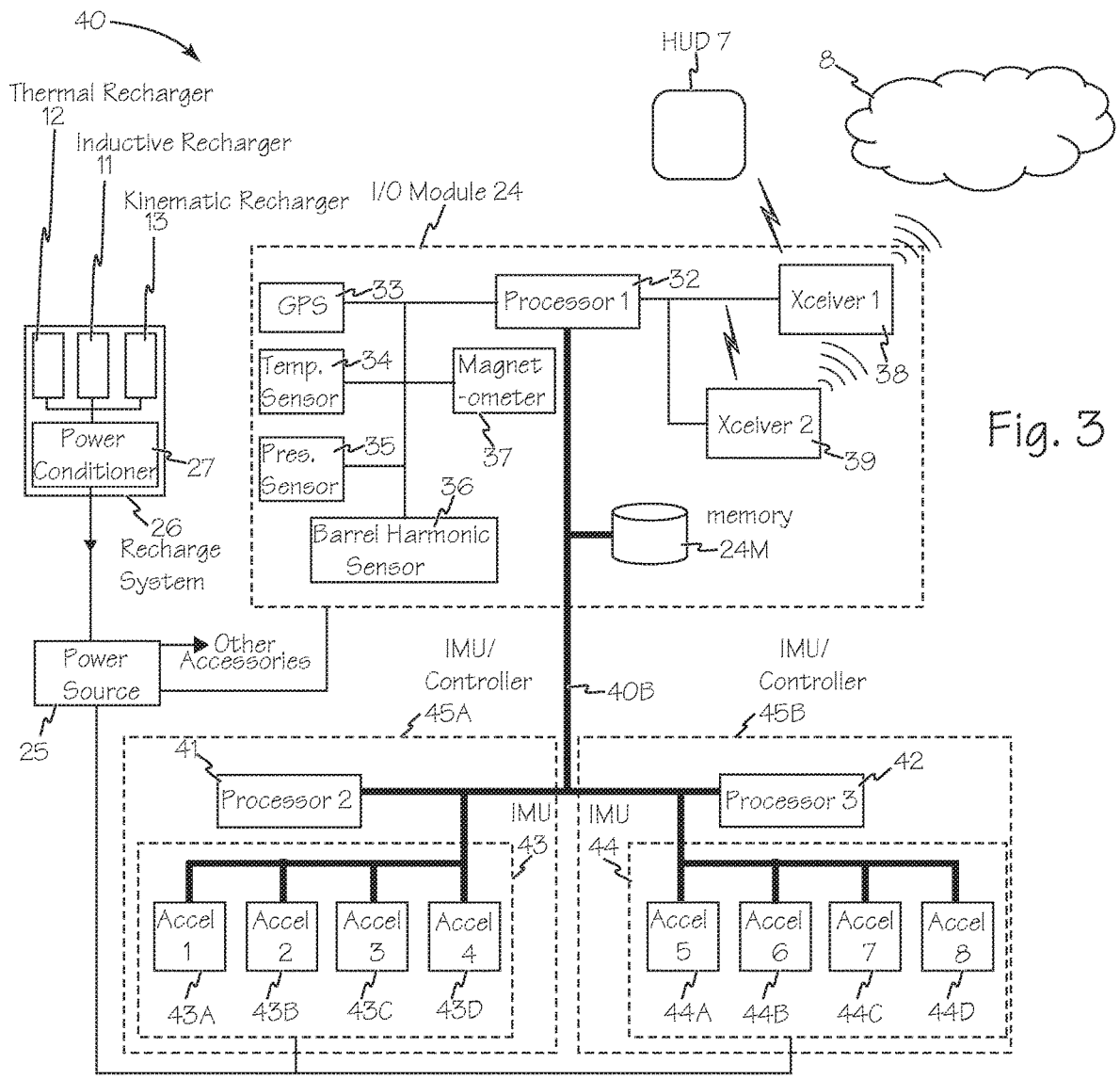
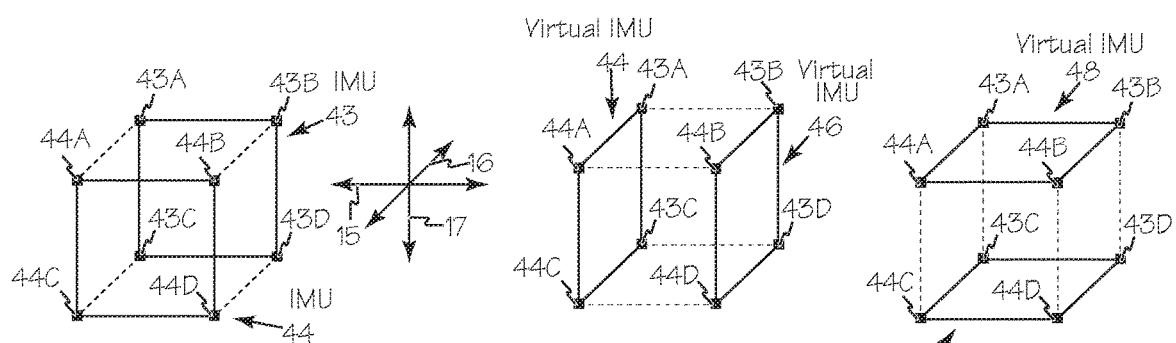
Fig. 4  Fig. 5  Fig. 6

FIREARM ELECTRONIC SYSTEM

RELATED APPLICATIONS

This application claims priority from U.S. Provisional Patent Application 62/290,785 filed Feb. 3, 2016.

FIELD OF THE INVENTIONS

The inventions described below relate to the field of man portable weapons with integrated electronics.

BACKGROUND OF THE INVENTIONS

Man portable weapons provide a vital tool to military forces, police organizations and security forces. These tools have been traditionally focused on providing ever more efficient delivery of bullets to a selected target. Communications, coordination and targeting have always been handled by separate systems carried by users.

SUMMARY

The devices and methods described below provide for man portable weapons with a firearms electronics system allowing the electronics to calculate orientation and movement in addition to providing that data to any suitable display such as a user's heads-up displays (HUD) and/or to group and area networks for presentation on any suitable display. By passing data to a HUD, the user is able to see, virtually, the flight path, point of impact and other ballistic data as well as data representing the condition and performance of the weapon for any rounds fired. The HUD and/or other displays also display the relative position of other members of the team, last known enemy area of operation and other useful parameters from the weapons of the other team members through the network. The firearms electronics system may be integrated within the main components of any suitable man portable weapon in a non-intrusive way as to have no effect on the firing mechanism of the weapon when it is fully assembled.

Alternatively the firearms electronics system may be removably secured to the exterior of any suitable man portable weapon to provide the location, orientation and movement of the weapon in addition to the flight path, point of impact and other ballistic data as well as data representing the condition and performance of the weapon for any rounds fired. This configuration enables a plurality of man portable weapons with removably secured firearms electronics systems to be supervised by a one or more displays via a network communicating with the plurality or firearm electronic systems to provide a single point of display showing the location, orientation and movement of the plurality of man portable weapons to which the plurality of firearms electronics systems are attached.

Man portable weapons with a firearm electronics system also include inductive recharging along with optional thermoelectric recharging and/or kinematic recharging components in a recharging system. Inductive recharging components are integrated into the reciprocating components of the firearm such as the buffer tube, bolt or slide to generate electricity through the induction of a current using the reciprocating components. Optional thermoelectric recharging components such as Peltier modules are attached to the barrel to harvest the heat generated by discharge of the firearm. The optional kinematic recharging components are included to convert the motion of the firearm into electricity for recharging the power source.

BRIEF DESCRIPTION OF THE DRAWINGS

FIG. 3 is a block diagram of a second electronic firearm system for the small arm of FIG. 1 connected through a network.

FIG. 4 is a block diagram of the accelerometer assembly arrays of the second electronic firearm system of FIG. 3.

FIG. 5 is a block diagram of an alternate configuration of the accelerometer assembly arrays of the second electronic firearm system of FIG. 3.

FIG. 6 is a block diagram of another alternate configuration of the accelerometer assembly arrays of the second electronic firearm system of FIG. 3.

DETAILED DESCRIPTION OF THE INVENTIONS

Figure 1:
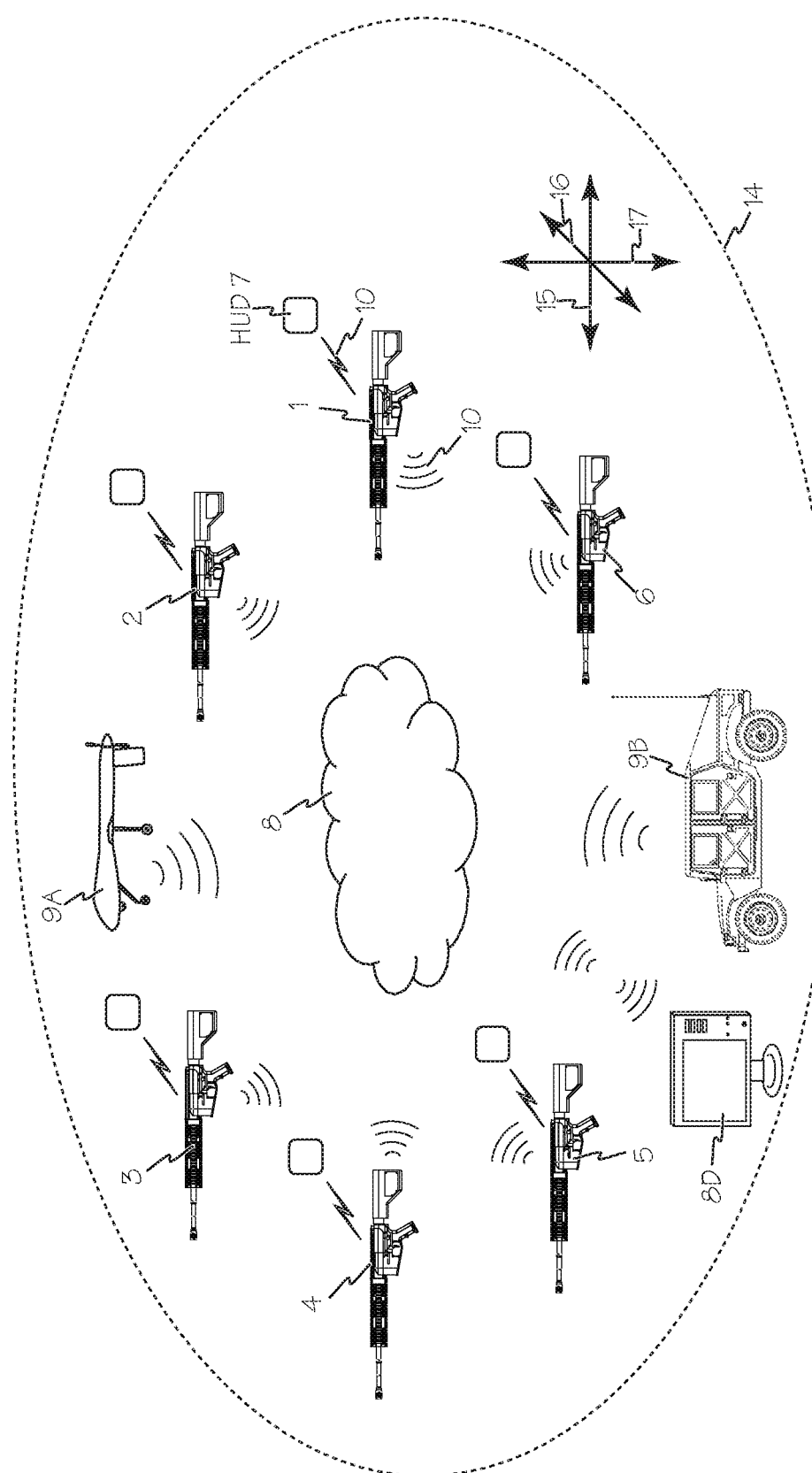
FIG. 1 is a block diagram of a group of man portable weapons with integrated electronics.

Man portable weapons with integrated electronics such as firearms or guns 1 through 6 of FIG. 1 communicate with a user's heads up display (HUD) such as HUD 7 and/or with any suitable network such as network 8. The electronics integrated into man portable weapons such as gun 1 measure operational parameters during the operation of the gun and perform real time analysis. The data gathered from the gun movement such as data 10 is then ready to be sent to the user's HUD, HUD 7, and/or to another system in a local or battlefield network such as network 8 for display on any suitable display such as display 8D. By having the integrated electronics having one or more inertial measurement units (IMU) embedded in the gun, the user has access to the location and orientation of gun 1 with respect to the battlespace 14 in terms of orthogonal axes such as X-Axis 15, Y-Axis 16 and Z-Axis 17. The user also has access to parameters such as position and orientation with respect to some theoretical and virtual coordinate system allowing for geographically independent calculations.

Figure 2:
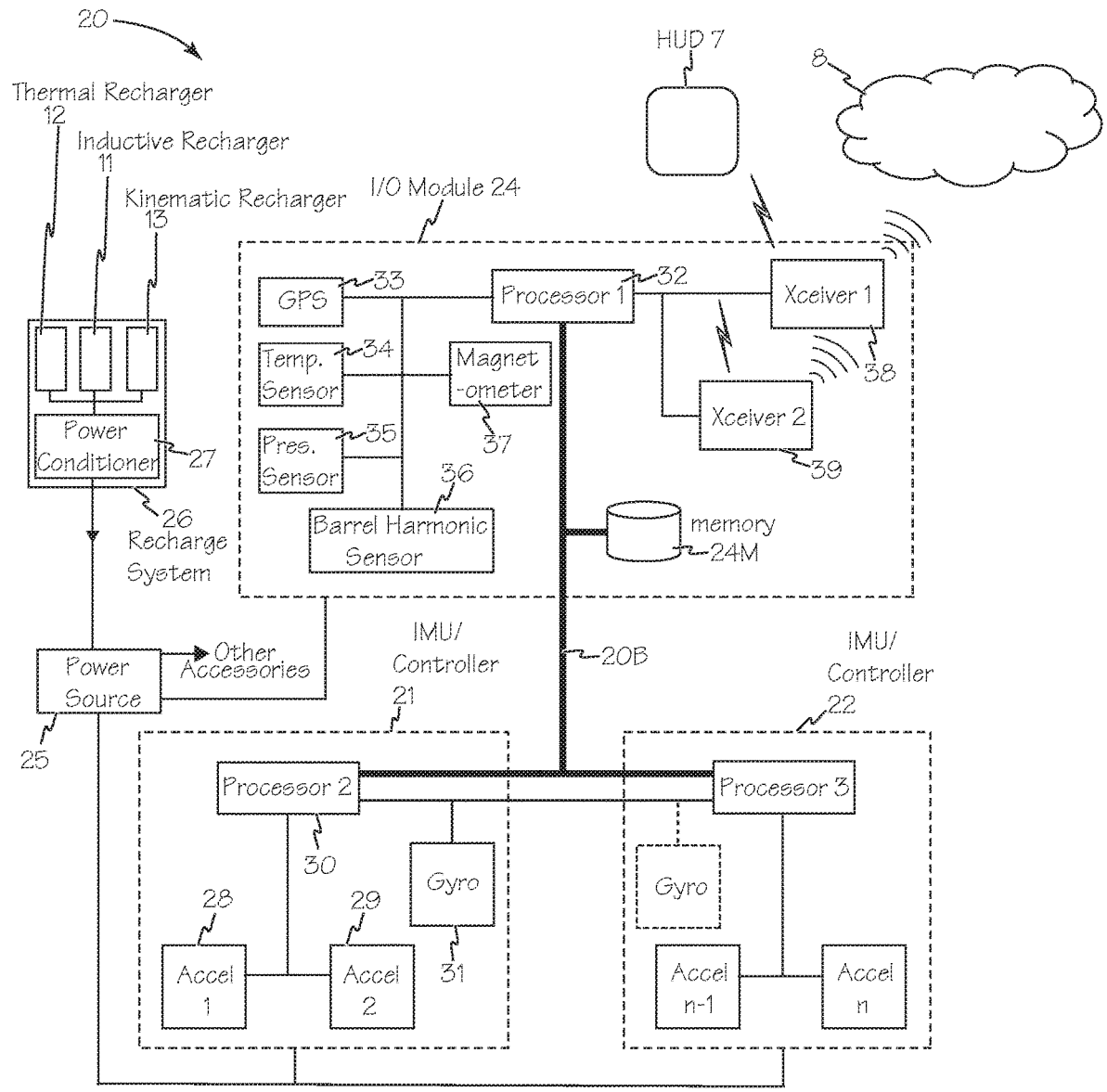
FIG. 2 is a block diagram of a first electronic firearm system for the small arm of FIG. 1 connected through a network.

Man portable weapons, firearms or guns such as gun 1 include an integrated electronics system such as electronic firearm system 20 illustrated in FIG. 2 or electronic firearm system 40 illustrated in FIG. 3 which is composed of several physical and virtual modules. Integrated electronics system 20 includes one or more inertial measurement units such as IMU 21 and IMU 22, input/output (I/O) module 24 and one or more suitable power sources such as power source 25 which may be one or more batteries. An optional recharging system such as recharging system 26 may also be integrated into gun 1 as part of integrated electronics system 20. Recharging system derives electrical energy from one or more of the following systems; inductive recharger 11, thermoelectric recharger 12 and/or kinematic recharger 13. The recharging energy is applied to power conditioner 27 which is operatively connected to power source 25.

I/O module 24 also includes processor 32 which is operatively connected to global positioning system (GPS) sensor 33, temperature sensor 34, pressure sensor 35, barrel harmonic sensor 36, magnetometer 37 and any suitable redundant transceivers such as first transceiver 38 and second transceiver 39. Temperature sensor 34, pressure sensor 35, barrel harmonic sensor 36 are optional sensors. Processor 32 is operatively connected to system memory 24M and the IMU/Controllers 21 and 22 via high speed bus 20B.

Each IMU, such as first IMU 21, includes multiple accelerometer assemblies, accelerometer assemblies 28 and 29, in a fixed configuration to enable precise motion and orientation tracking as well capturing performance and vibration data. Configuring integrated electronics system 20 to include redundant IMUs such as IMU 21 and IMU 22, each with redundant accelerometer assemblies and at least one processor 30, and at least one gyroscope 31 adds redundancy and improves accuracy. Should one IMU fail the other will be available to perform its tasks. Furthermore, each module is comprised of the PCB with a set of mounted electronics (CPU/MCU, accelerometer(s), GPS, Gyro, wireless module(s) and circuit protection) and its plastic enclosure to further protect the circuitry from temperature fluctuation, water and the firearm itself. Each module will be independently routed to the power system and operably connected to each other via communications bus 20B between processors.

Each IMU/controller is an independent and redundant control system for electronic firearm system 20. Each of redundant control systems represented by IMU/controllers 21 and 22 is programmed to receive data from all the accelerometer assemblies, the gyros, the magnetometer and the GPS as well as any of the other optional sensors that are present such as temperature sensor 34, pressure sensor 35 and barrel harmonic sensor 36. The control systems also receive and process data received from other users such as weapons 2, 3, 4, 5 and/or 6 via network 8. The control systems represented by IMU/controllers 21 and 22 are programmed to calculate the location and orientation of gun 1 with respect to the battlespace as well as calculating parameters such as position and orientation with respect to some theoretical and virtual coordinate system allowing for geographically independent calculations. The control systems also calculate the flight path, point of impact and other ballistic data as well as data representing the condition and performance of the weapon for any rounds fired. This data is also displayed by the HUD. The HUD also displays the relative position of other members of the team represented by weapons 2, 3, 4, 5 and/or 6, last known enemy area of operation and other useful parameters from the man portable weapons of the other team members or other assets such as vehicles 9A and/or 9B through the network 8.

For each user, the data received and calculated by each control system, IMU/controllers 21 and 22 is passed to the user's HUD such as HUD 7 and will display a simulated crosshair which may be used with or in lieu of a laser sight. The azimuth and elevation data may also be displayed to assist the user in long-range shots. Auxiliary data may also be displayed such as a simulated compass, ambient temperature, barrel temperature, barometric pressure, shot count, etc.

With multiple users interconnected through a network such as network 8, each user's integrated electronics system displays the locations of other users in the group, along with their status (OK, Engaged, Need Assistance, etc.) in a virtual environment. This simplifies coordination between group members when silence is critical. This also allows for the display of target locations. The electronics integrated into any suitable man portable weapon enables the user's data as well as data from the other members of the group to be relayed via the integrated electronics/network data communication link. This data transfer enables faster reaction times, for example when groups arrive at a new area of operation. The ability to request available close range and infantry deploy-able air support such as small drone 9A and/or from a suitable land vehicle such as Humvee 9B which may adjust surveillance and reconnaissance coverage by taking group movements into consideration.

FIG. 3 is a block diagram of firearm electronics system 40 which includes redundant processors 41 and 42 operatively connected to redundant accelerometer IMUs 43 and 44 as well as I/O module 24 via bus 40B and to recharge system 26 as discussed above. Processor 41 and accelerometer IMU 43 are collocated on a board forming IMU/Controller 45A. Processor 42 and accelerometer IMU 44 are collocated on a board forming IMU/Controller 45B. Each of accelerometer assemblies 43A, 43B, 43C, 43D, 44A, 44B, 44C and 44D are 3 axis accelerometers or an assembly of 3 orthogonally oriented single axis accelerometers. The accelerometer assemblies in each IMU are arranged in any suitable coplanar arrangement with their orthogonal axes parallel to X-Axis 15, Y-Axis 16 and Z-Axis 17 as illustrated in FIG. 4. The controlled orientation of the accelerometer arrays of IMU 43 and IMU 44 enables creation of virtual IMUs for redundant Distributed Accelerometer Inertial Measurement Units (DAIMU). Each accelerometer IMU requires only three accelerometer assemblies to function as described. Additional optional accelerometer assemblies provide redundancy and improved accuracy. The disclosed electronics system uses two IMUs, each with four accelerometer assemblies. Two or more accelerometer IMU arrays may be combined to create a cube or other suitable shape, while three accelerometer IMU arrays together to create an extruded hexagon.

Each individual accelerometer (one axis in an accelerometer assembly) is related to its orientation and this information is stored in position and orientation matrices. A number of these matrices may be populated in anticipation of several possible configurations of accelerometer assemblies. Pre-calculating the inverse of a regressor matrix, T, which is defined as $\Gamma$, where $\Gamma = T^{-1}$, for each configuration reduces executable code and saves several operations during runtime. With the origins defined in software, the availability of the matrices and vector in memory enables virtual reconfiguration at any time while processing continues.

FIGS. 5 and 6 illustrate two possible virtual reconfigurations creating virtual IMUs 46, 47, 48 and 49. One such matrix is the inverse of a regressor matrix, T, which we define as $\Gamma$, where $\Gamma = T^{-1}$.

Figure 7:
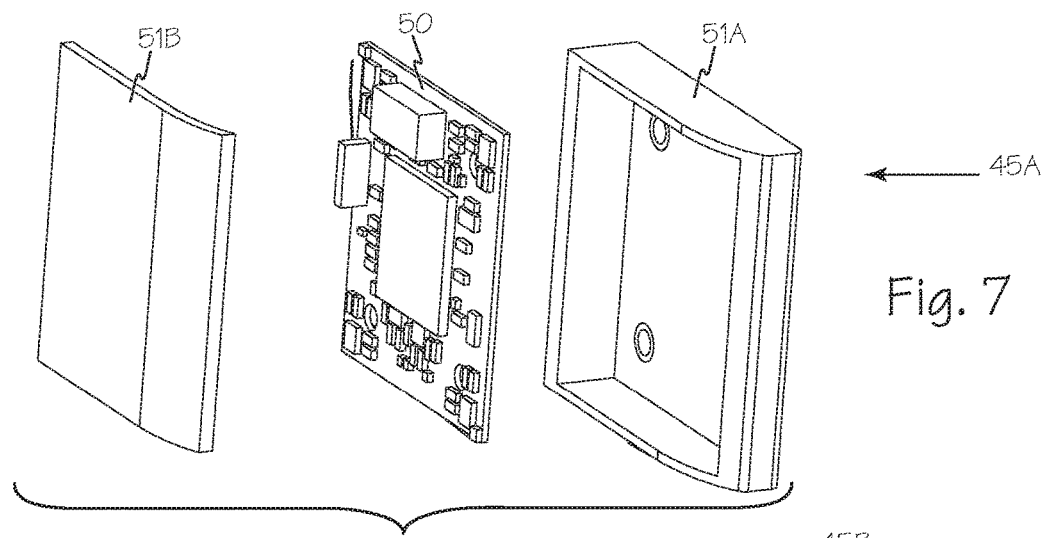
FIG. 7 is an exploded perspective view of an IMU/Controller module.

FIG. 7 is a perspective view of IMU/Controller 45A and its enclosure. IMU/Controller board 50 is enclosed in housing 51 composed of enclosure 51A and lid 51B.

Figure 8:
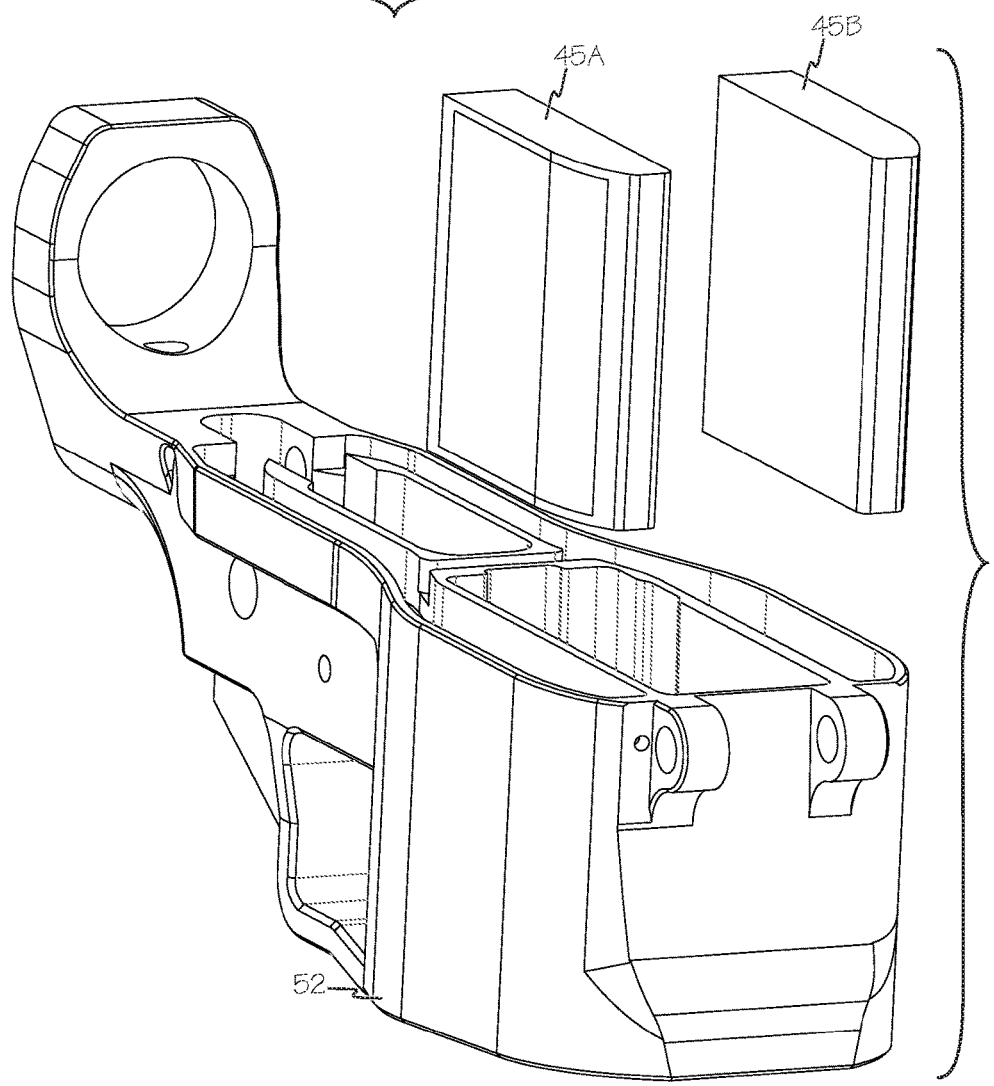
FIG. 8 is an exploded perspective view of a lower receiver and redundant IMU/Controller modules.
Figure 9:
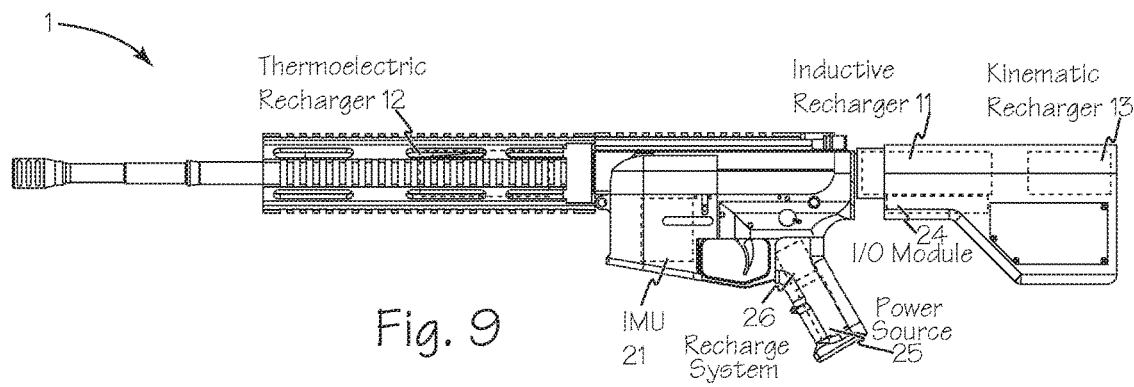
FIG. 9 is a side view of the small arm with integrated electronics of FIG. 1.
Figure 10:
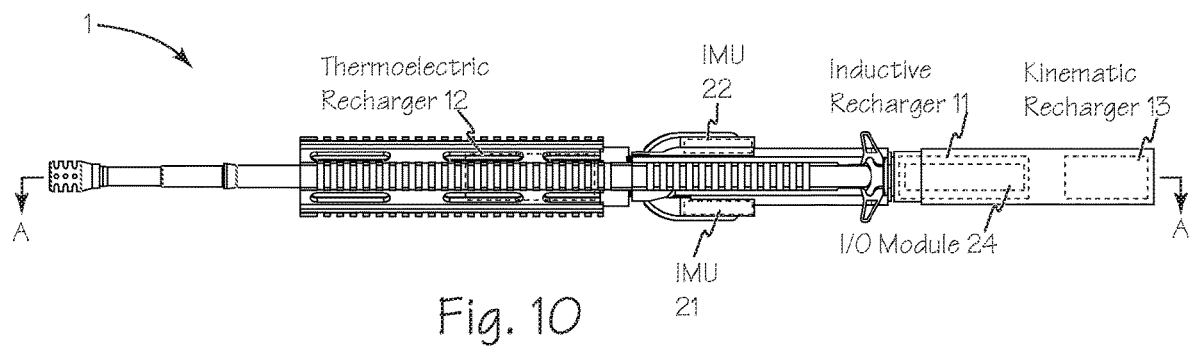
FIG. 10 is a top view of the small arm of FIG. 1.
Figure 11:
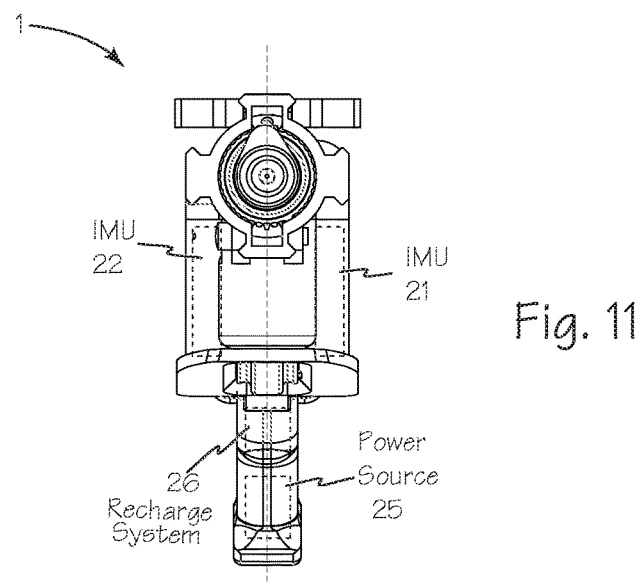
FIG. 11 is a front view of the small arm of FIG. 1.
Figure 12:
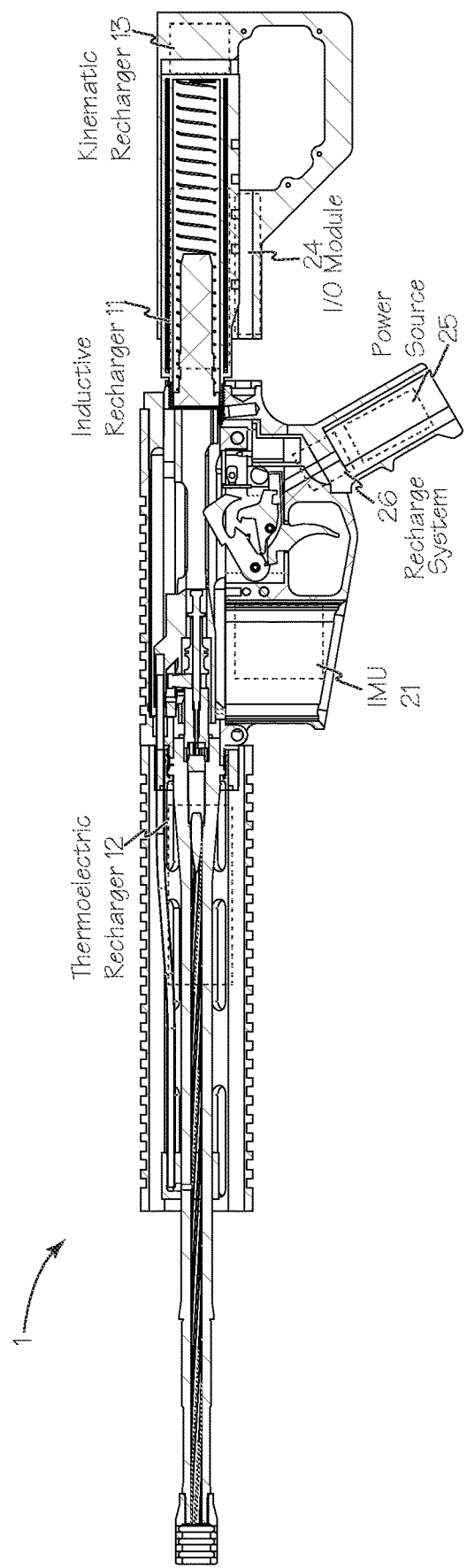
FIG. 12 is a cross section of the small arm of FIG. 10 taken along A-A.

FIG. 8 is an exploded perspective view of lower receiver 52 and redundant IMU/Controllers 45A and 45B.

FIGS. 9, 10, 11 and 12 illustrate the modules of integrated electronics systems 40 in an M-4 small arm. This configuration is suitable for any and all of the variants such as AR-10, AR-15 and M-16. Integrated electronics system 20 or 40 may also be integrated into any suitable man portable weapon or light weapon and is not limited to small arms as described and may be suitably integrated into larger caliber weapons such as .50 caliber rifles, pistols, machine guns and or rocket/grenade launchers or they may adapted to be used as an external attachment to existing man portable weapons.

In any man portable weapon equipped with a buffer tube such as an M-4 or AR small arm, inductive recharge system 11 may be integrated into the buffer tube. Alternatively, the inductive recharge system may be integrated into the stock surrounding the buffer tube.

Power source 25 or any other suitable accessory is recharged by induction of a current using any suitable reciprocating components of the small arm. The traditional buffer tube seen on AR's will be replaced with a buffer tube that has had a coil integrated within it. This buffer tube will use the same mounting methods as conventional buffer tubes. Suitable magnets are integrated into one or more of the following components; the buffer, the buffer spring, the carrier, the carrier bolt or any of the other reciprocating components of the firing system. The back and forth movement of the magnets through the wire coil of the charging system will induce a current. The wire coil will be connected through power conditioner 27, illustrated in FIGS. 2 and 3 that will ensure that the energy created through the cycling of the firearm meets the specification and capabilities required for charging power source 25 or any other connected accessories that will be used, as well as keeping the system powered while batteries are replaced. Power source 25 can be placed within the buttstock, the handgrip or any other suitable portion of the firearm.

During the rectification process in power conditioner 27, the peak-to-peak voltage from inductive recharger 11 may be used as an indicator for firearm condition during operation. The voltage signal generated by the inductive recharger is an indicator of bolt carrier velocity, travel and quality. For example, different amplitudes (peak to peak voltages) are directly proportional to velocity of the bolt carrier. Signal Period, frequency, and condition will indicate bolt carrier location (In case of jam) and translation quality (In case of mechanical friction caused by a change in the system). For example, only one peak may indicate that the bolt carrier group has been locked back or has jammed. Other power signal characteristics from thermoelectric recharger 12 and kinematic recharger 13 may support additional performance diagnosis.

The independent and redundant control systems represented by IMU/controllers 45A and 45B are programmed to process the output signals from at least the accelerometer arrays of IMU 43 and IMU 44 as well as GPS 33, and magnetometer 37 and any other optional sensors present in I/O Module 24. The control systems are programmed to perform the signal processing illustrated FIG. 13 as signal processing system 53. Each IMU/Controller is a virtual configuration of distributed components.

Each of processors 30, 32, 41 and 42 include built-in analog to digital converters (ADC) such as ADC 56 which sample outputs of each accelerometer from each of the x, y and z, axes simultaneously for all accelerometer assemblies 43A, 43B, 43C, 43D, 44A, 44B, 44C and 44D. So, for a number of accelerometer assemblies, say 4, there are n=(4*3)=12 samples that are retrieved simultaneously. When the ADC is finished converting the sample at time, $t_k$, 16-bit analog values are converted to digital signals corresponding to the accelerations experienced by the accelerometers. These signals create a pre-filtered Accelerometer Sample Vector, $A_s$, which is an n-element column vector. Accelerometer Sample Vector, $A_s$ illustrated in equation 1 is applied to filter 57 which may be a finite impulse response (FIR) filter, a notch filter, an Nth order Butterworth Filter or Chebyshev filter. The filtered acceleration sample vector 58 is applied to differential equation processor 59 for processing.

$$A_s = T\dot{B} + TC[\omega(k)] \quad \text{Equation 1}$$

$$\dot{B} = \Gamma A - \Gamma C[\omega(k)] \quad \text{Equation 2}$$

The centripetal acceleration vector, $C[\omega(k)]$, is a function of angular velocity, $\omega$. The solution, illustrated in equation 2 is the acceleration vector, $\dot{B}$, where the upper and lower halves are angular and linear acceleration, respectively. Then integrating the angular acceleration to get angular velocity.

Equations 3 and 4 below are implemented in the gyro simulator 60 which is used to calculate a prediction to the angular velocity, $\omega(k+1)$ which is fed back to the differential equation processor 59 to improve performance.

$$G[\omega(k)] = -\Gamma(\partial C[\omega]/\partial \omega) \quad \text{Equation 3}$$

$$\Psi(k) = \Delta t [I_n - G[\omega(k)]]^{\{-1\}} \quad \text{Equation 4}$$

Equation 3 is again a function of angular velocity by way of the second term on the right hand side, which is a Jacobian matrix. The result of equation 3 is then subtracted from an Identity matrix and inverted, then multiplied by the time difference from the last iteration.

Controllers 59C and 60C are used to smooth the response of the angular velocity output from the system using prediction value $\omega(k+1)$. Several controllers may be suitable to ensure a bounded output and a desired response of the angular velocity. A number of variations of the proportional-integral-derivative (PID) controller may be used (PI, PD, PI-D) to ensure desired system response for $\omega(k)$. Another way to ensure desired response is to implement an H∞ (H-infinity) controller, where the prediction value $\omega(k+1)$ is constantly fed back into the system. Whenever recommended minimum data, data 61 is available from the GPS, the heading angle, and Euler rates, dq/dt are applied as input to another controller/filter, filter 62.

The GPS coordinates as partial state vector 63, body frame velocity 64 and corrected angular velocity 65 are applied to the Filter module 66, here a Kalman filter to determine state vector 67 and state vector derivative 68. This data is transformed to Earth Centered Earth Fixed (ECEF) and applied to the redundant transceivers such as transceiver 38 for transmission to other users in the network and to targeting system 70.

Data from IMU signal processing system 53 of any of guns 1, 2, 3, 4, 5 or 6 or any other user accessing network 8 is received as data packet 71. After verifying it is a good packet, data 71D is extracted and parsed. The type of data is determined and evaluated. Data packets such as packet 71 include a multi-bit status word for the system that generated the packet, so that the receiving system may determine the status of other users in the network. On regular intervals, each system transmits a packet that consists of:

Type of data being transmitted;
Status of the system that generated the packet, this also includes the user's status (OK, Need assistance, Engaged, . . . );

Time in UTC, in any suitable format such as hh:mm:ss;
Internal system tick value, in milliseconds of the system that generated the packet. This is used to account for the delay in transmission and processing on both ends;
Squad member number. For example, the squad leader might be 0, the next member 1, 2, . . . , etc;
Position of the generating system at time of transmission;
Orientation of the generating system at time of transmission.

The receiving system transforms the coordinate system accordingly, does any distance and calculations, etc. and updates the last known locations of the other systems/teammates.

Targeting system 70 includes a model for squad/platoon formations, which might help in training or for Command and Control (C2). For example, "Squad Formation" verification 72 "Check Squad Status" 73 are implemented in software. These functions are fed back to the tracking model. Based on the squads formation and status there may be a need to periodically evaluate the status of all members, in which case, a "situation request" or "SITREQ" packet is broadcast. This merits a "situation report" or "SITREP" packet be returned.

Hooks for other packet types for example mission objectives (C2 Data), objectives sent from squad leader, etc. are also present in packets such as packet 71.

Figure 13:
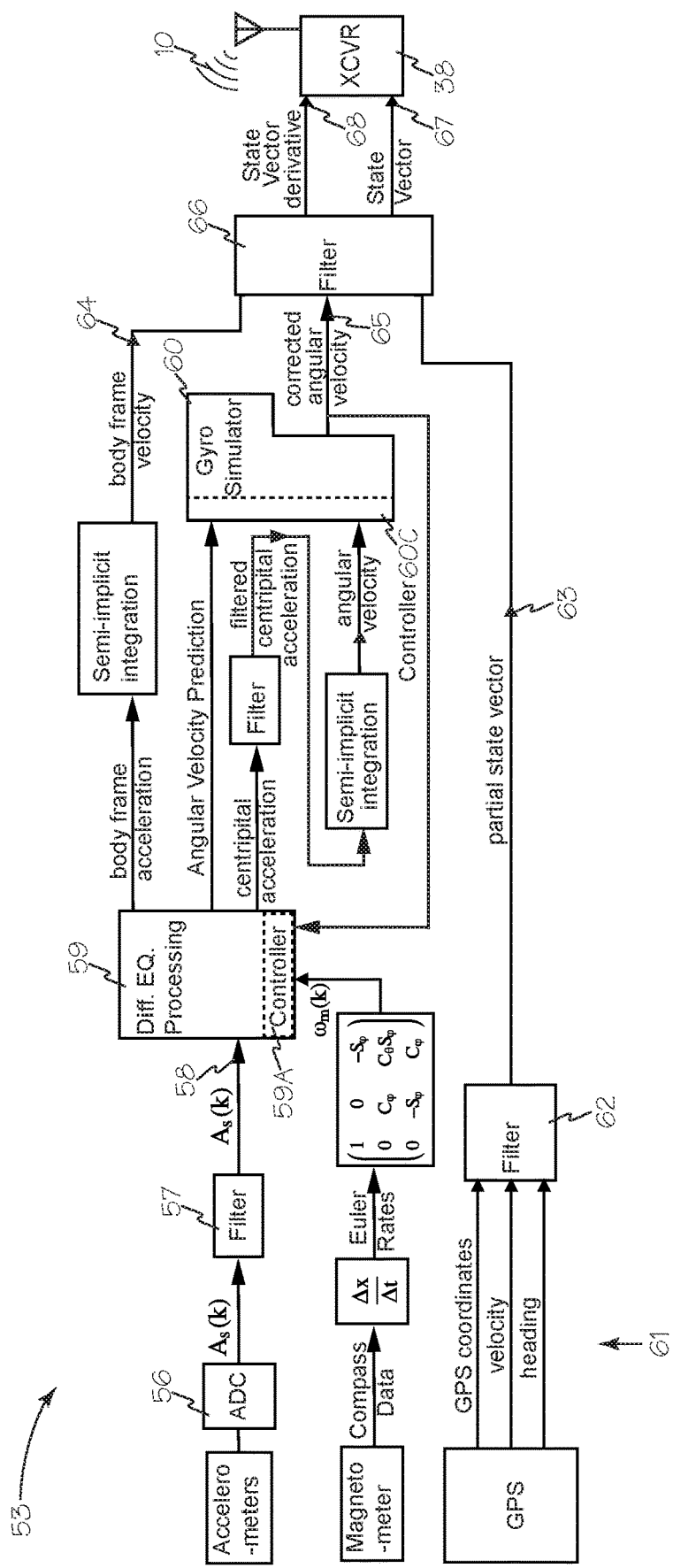
FIG. 13 is a flow chart of operation of a distributed accelerometer inertial measurement unit.
Figure 14:
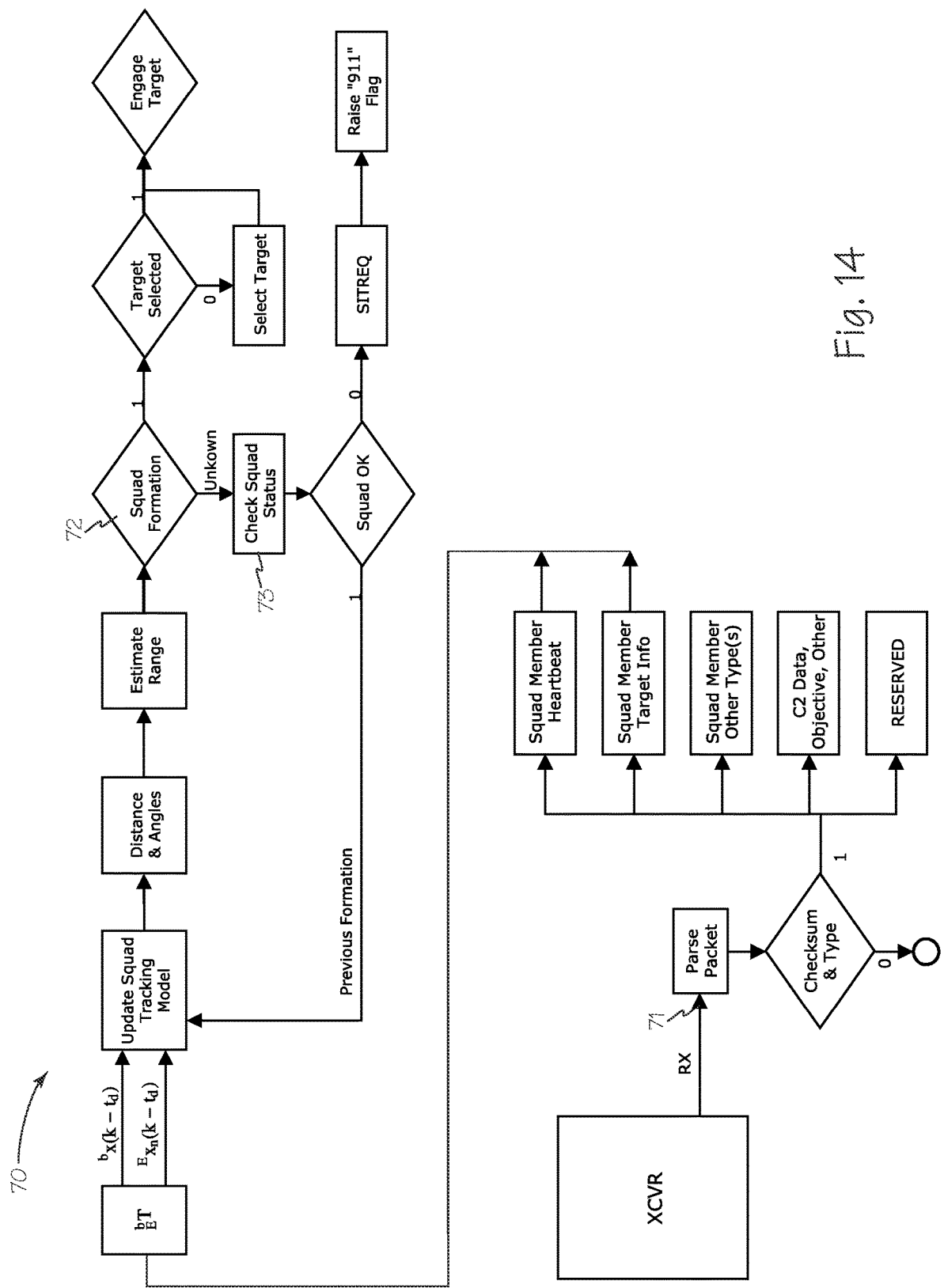
FIG. 14 is a flow chart of the targeting system.

Using the filtered samples from all the accelerometer assemblies as illustrated in FIG. 13, a subroutine may be initiated after a shot is detected, that would allow further analysis of specific acceleration signals. The subroutine would perform impulse detection and comparison only on the accelerometer axes parallel to bore center. Positive shot detection is based on receipt of an impulse, and confirming that certain IMU flags are not set. In that case a muzzle velocity estimate may be generated. If it falls within a predetermined range, an interior ballistics model is then solved for pressure at certain points in the barrel. These pressures may then be input into a shell theory (for example, Donnell Mushtari) model for a probable vibrational mode, which is then relayed to the user.

The electronic firearm system 40 may be removably secured to any suitable man portable weapon to provide the location, orientation and movement of the weapon in addition to the flight path, point of impact and other ballistic data as well as data representing the condition and performance of the weapon for any rounds fired.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. An electronic firearm system for a man portable firearm comprising:
 a first inertial measurement unit/controller having at least three accelerometer assemblies with each accelerometer assembly having three orthogonal axes;
 a second inertial measurement unit/controller having at least three accelerometer assemblies with each accelerometer assembly having three orthogonal axes;
 wherein each of the at least three accelerometer assemblies in first inertial measurement unit/controllers are oriented to be coplanar with their orthogonal axes parallel to an x-axis, a y-axis and a z-axis and the at least three accelerometer assemblies in second inertial measurement unit/controllers are oriented to be coplanar with their orthogonal axes parallel to the x-axis, the y-axis and the z-axis;
 a control system programmed to use data from both the first and second inertial measurement unit/controllers to calculate the location and orientation of the man portable firearm with respect to a battlespace as well as calculating position and orientation with respect to a virtual coordinate system;
 an input/output module operatively connected to the first inertial measurement unit/controller and the second inertial measurement unit/controller, the input/output module including a global positioning system (GPS) receiver, a magnetometer and at least one transceiver for transmitting and receiving data; and
 a power source operatively connected to provide power to the input/output module, the first inertial measurement unit/controller and the second inertial measurement unit/controller.

2. The electronic firearm system of claim 1 further comprising a heads up display receiving and displaying data from the at least one transceiver.

3. The electronic firearm system of claim 2 wherein the flight path, point of impact and ballistic data as well as data representing the condition and performance of the man portable firearm for rounds fired is displayed on the heads up display.

4. The electronic firearm system of claim 1 further comprising:
 a recharging system including a power conditioner operatively connected to the power source.

5. The electronic firearm system of claim 4 wherein the recharging system further comprises:
 an inductive recharger.

6. The electronic firearm system of claim 4 wherein the recharging system further comprises:
 a thermoelectric recharger.

7. The electronic firearm system of claim 4 wherein the recharging system further comprises:
 a kinematic recharger.

8. The electronic firearm system of claim 1 wherein the input/output module further comprises:
 a pressure sensor.

9. The electronic firearm system of claim 1 wherein the input/output module further comprises:
 a temperature sensor.

10. The electronic firearm system of claim 1 wherein the input/output module further comprises:
 a barrel harmonic sensor.

11. The electronic firearm system of claim 1 further comprising a display receiving and displaying data from the at least one transceiver.

12. The electronic firearm system of claim 11 wherein the flight path, point of impact and ballistic data as well as data representing the condition and performance of the man portable firearm for rounds fired is displayed on the display.

13. The electronic firearm system of claim 1 configured to be integrated into a man portable weapon.

14. The electronic firearm system of claim 1 configured to be operably engaged to the exterior a man portable weapon.

15. The electronic firearm system of claim 1 wherein the first and second inertial measurement unit/controllers each include four accelerometer assemblies.

\* \* \* \* \*